United States Patent

[11] 3,621,224

| [72] | Inventor | Robert E. Friday<br>Overland Park, Kans. |
|---|---|---|
| [21] | Appl. No. | 862,362 |
| [22] | Filed | Sept. 30, 1969 |
| [45] | Patented | Nov. 16, 1971 |
| [73] | Assignee | King Radio Corporation<br>Olathe, Kans. |

[54] ELECTRONIC TRACK AND STORE DEVICE
10 Claims, 6 Drawing Figs.

[52] U.S. Cl. .................................................. 235/183,
235/150.51, 328/151
[51] Int. Cl. ....................................................... G06g 7/18
[50] Field of Search........................................... 235/183,
150.5, 150.51, 150.52, 150.53, 150.4; 340/347;
320/1; 328/151, 179, 181

[56] References Cited
UNITED STATES PATENTS
| 3,192,371 | 6/1965 | Brahm ........................ | 235/150.51 X |
|---|---|---|---|
| 3,348,216 | 10/1967 | Vinson ........................ | 320/1 X |
| 3,390,354 | 6/1968 | Munch ........................ | 340/347 UX |
| 3,436,756 | 4/1969 | Myers et al. ................ | 340/347 UX |

Primary Examiner—Joseph F. Ruggiero
Attorney—Scofield, Kokjer, Scofield & Lowe

ABSTRACT: An electronic device for tracking and/or storing an electrical voltage level that utilizes an analog integrator, with an associated switch for performing track and initial storage. A hybrid feedback system prevents drift in the integrator output by utilizing the time required for a periodic fixed-rate pump signal to rise to the level of the integrator output signal, This time is used to determine the number of cycles from a fixed-frequency oscillator that occur in that time period. Deviations in the number of cycles (or portions of a cycle) occurring in the time interval are used to generate an error signal which is fed back to the integrator to correct for integrator voltage drift thereby causing the output of same to seek a quantum but stable value.

INVENTOR,
ROBERT E. FRIDAY

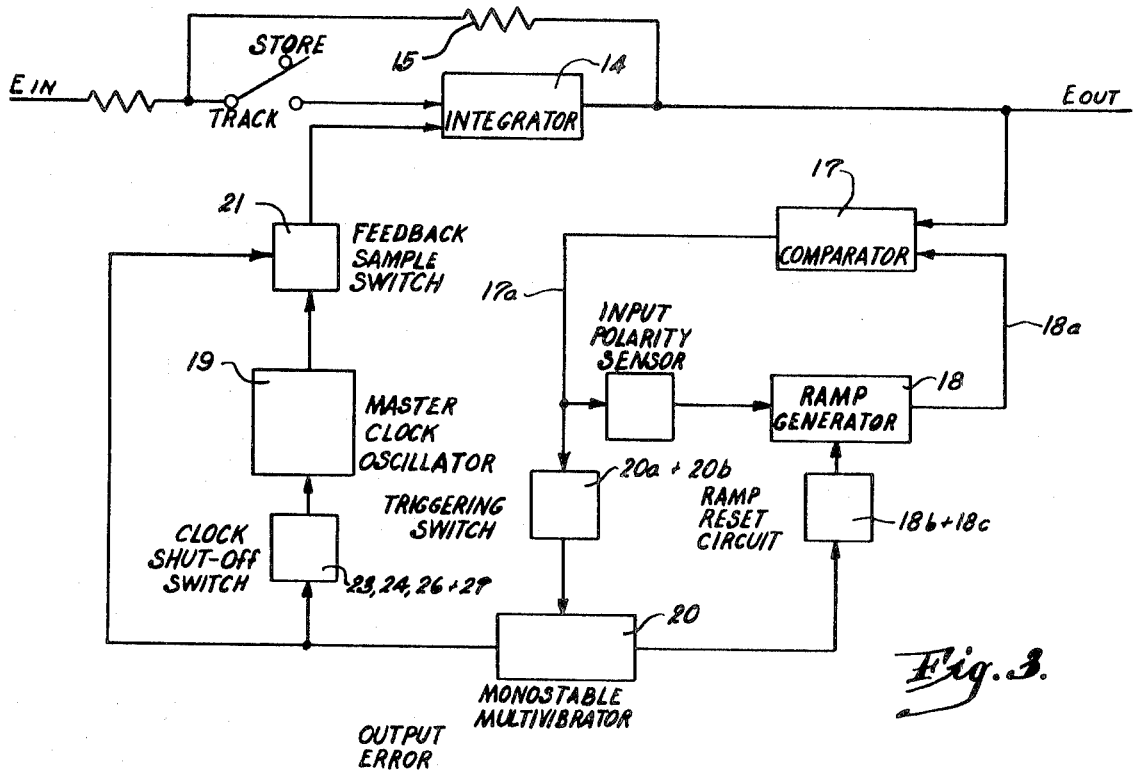
Fig. 3.
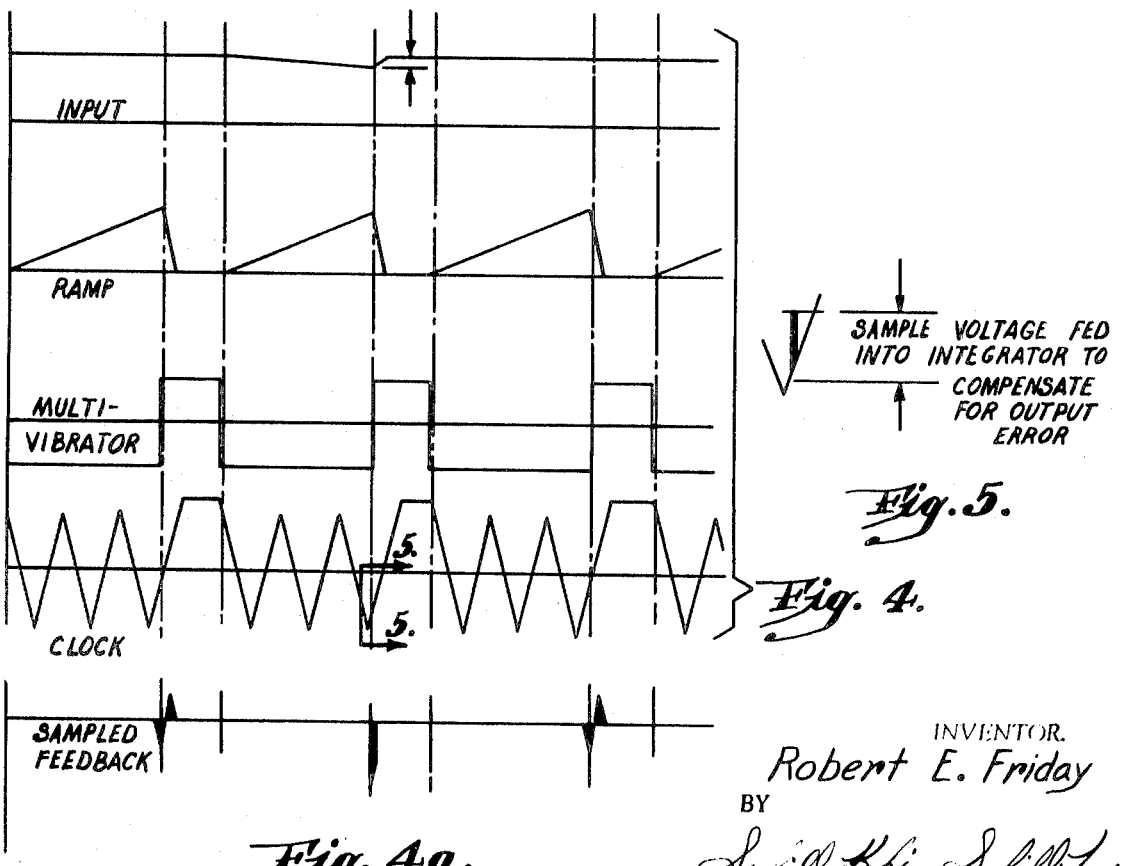
Fig. 4.
Fig. 4a.
Fig. 5.
INVENTOR.
Robert E. Friday

ELECTRONIC TRACK AND STORE DEVICE

BACKGROUND AND BRIEF DESCRIPTION OF THE INVENTION

Synchronizers or electronic track and store devices have been utilized as control apparatus in avionic systems for some time. In these devices a given reference voltage relating to a certain parameter of a flight regime is established and maintained. The output voltage of the device represents a level or signal at the input and is maintained indefinitely at the output following the removal of the input signal. For example, in an autopilot system, the various parameters may include heading, pitch and roll attitude, airspeed and other related variables. If it is desired to maintain a voltage which corresponds to the pitch attitude parameter, the pilot may wish to establish that parameter within the autopilot system at various times during the flight. If the pilot wishes to climb at an angle of 10° to the horizon, he places the aircraft in that attitude and depresses a button on the autopilot, locking the synchronizer (track and store or integrator device) at a voltage corresponding to 10° of pitch attitude. A similar operation may be had with reference to heading, indicated airspeed and/or attitude hold mode.

In each of the above-mentioned synchronizing modes, the function basic to each is the establishment of a voltage for an indefinite period of time that represents the desired parameter that the pilot wishes to utilize. The establishment of this voltage can be performed by several different methods including electromechanical.

The prior art methods of electronic track and indefinite store include the use of a digital clock (square wave) to drive a standard binary counter consisting of one or more cascaded flip-flops. An electrical admittance equal to the corresponding numerical value is connected to each flip-flop and summed at the input of an analog amplifier. The output is then an analog voltage proportional to the binary numbers stored in the flip-flops. The flip-flops may be periodically reset so that a new count can be made to determine if the stored number is still the same as the reference voltage it is tracking. This method has limited resolution due to the inaccurate summing capabilities of more than four flip-flops.

Another totally electronic technique is to utilize the digital clock to drive two identical binary counters consisting of one or more cascaded flip-flops. The input to each of the counters is controlled by a switch such that the clock may be connected to one or the other or both counters depending upon the reference input voltage and upon the "store" command. The counters act like frequency dividers so that the output frequency is equal to the input frequency divided by $2^n$ where "$n$" is the number of flip-flops in each counter. Each cycle of the output, therefore, is composed of $2^n$ cycles of the input square wave. This number describes the resolution of the device.

Useful information is obtained by forming the difference of the two output waveforms and by filtering the result to obtain an analog voltage. By disconnecting the clock from one or the other of the counters, a phase shift between the two outputs will appear and result in an output voltage from the filter circuit. In order to "store" this voltage, the clock is reconnected to both counters which provide output square waves of equal frequency but with a constant phase shift, the values of which determines the voltage output from the filter.

My invention relates to an electronic track and store system for use with flight control equipment which includes an analog integrator (with a conventional switch) to perform the tracking and initial storage. A hybrid feedback system prevents drift in the integrator output when an associated switch is at the "store" terminal. In this regard, the time required for a periodic fixed-rate ramp signal to rise to the level of the integrator output (E out) is periodically monitored. This time is used to determine the number of cycles of a fixed frequency oscillator that will occur in that time period. Errors or deviations in the number of cycles (actually my device utilizes a portion of a cycle) occurring in the time interval are used to generate an error signal which is fed back to the integrator to correct for output voltage drift. As a result, the E out becomes a quantized but stable value.

The above is accomplished by utilization of a combination comparator-ramp generator circuit. The output from the above-mentioned integrator is fed into a differential comparator along with the output of the ramp generator. At the start of a sequence, the ramp generator output is 0 so that the comparator output polarity is solely determined by the output polarity of the integrator. This polarity determines the direction (positive or negative) in which the ramp waveform will go from 0. Since the ramp waveform is fed into the comparator, and since the magnitude of the ramp waveform is continuously increasing, a time will come when the ramp voltage just exceeds the integrator voltage. This time period represents the "specified period of time" during which a fixed number of clock cycles will occur and will be maintained. When the ramp voltage does exceed the integrator voltage, the voltage polarity at the output of the comparator reverses and signals the beginning of the feedback portion of that sequence.

An electrical switch detects the polarity reversal at the output of the comparator and causes a monostable multivibrator to switch to the quasi-stable state. A "ramp reset circuit" detects the quasi-stable state and causes the ramp generator to reset to 0 volts and remain at 0 volts until the multivibrator returns to the stable state. At this time a new sequence begins and the ramp begins to increase in magnitude again.

A master clock which is basically a free-running multivibrator capable of being stopped and started by means of an input from the monostable multivibrator is included in the feedback system. When the multivibrator goes to the quasi-stable state, the clock stops. Likewise, when the multivibrator returns to the stable state at the start of a new sequence, the clock starts to run again. The output (a triangular waveform) is produced by the master clock and fed into a "feedback sample switch." This switch effectively disconnects the clock output from the integrator except for an instant during the transition of the monostable multivibrator from the stable state to the quasi-stable state (at the end of the "specified period of time"). Since the master clock output is symmetrical about 0 volts (triangular waveform) it clearly passes through 0 every half cycle. If the multivibrator transition occurs when the triangular waveform is passing through 0, the "feedback sample switch" would connect the waveform to the integrator for an instant of time but no current would be fed into the integrator and no integrator output change would result. If, however, the integrator output voltage had decreased slightly during the sequence, the "specified period of time" would be shorter because the ramp would reach the integrator voltage sooner. This would result in the "feedback sample switch" connecting the triangular waveform to the integrator before the waveform reached 0 volts, and thus would cause current to flow into the integrator in such a direction and magnitude as to return the integrator output to a value that would result in the following sample occurring as the clock output (triangular waveform) passes through 0.

My invention has utility aside from being a track and store device in that it may also be used as a mathematical integrator. Basically, an integrating device is used to sum the area beneath a time dependent voltage or current waveform. In this manner, any steady state long term voltage errors that may exist in an autopilot system are eliminated. For example, on altitude hold, if the aircraft had a tendency to fly 50 feet below a desired altitude, the integrating device would very slowly return the aircraft to the desired altitude. Also, if an aircraft is continuously flying below the glide slope beam of an ILS system, the integrating device would slowly return the aircraft to the center of that beam.

An object of my invention is to provide a uniquely constructed electronic track and store device that economizes on the number and type of parts used therein, therefore decreasing the cost and the volumetric space normally needed for same.

Another object of my invention is to provide a uniquely constructed synchronizing device which may be used with one or more input voltage parameters. It is a feature of my invention that the subject device may be used with very rapidly changing input parameters so as to enable the device to respond with an extremely fast output for a given input.

A further object of my invention is to provide a uniquely constructed synchronizing device which permits variation in the resolution of same in a unique manner.

A still further object of my invention is to provide a synchronizing device of the character described immediately above which utilizes both a fixed frequency oscillator and a ramp generator to prevent the output of the synchronizer from drifting. An important feature of this object resides in the fact that the resolution of the synchronizing device may be changed or varied simply by changing the frequency of the oscillator (clock) or the speed of the ramp generator. As a result, it is not necessary to increase or decrease a number of memory circuits normally associated with the device to vary the resolution of same. (In the present art, the resolution of a synchronizing device is considered to be the number of parts in which a given voltage range or input parameter can be divided into).

Another object of my invention is to provide a uniquely constructed electronic synchronizing device that combines analog and digital the in a unique manner to vary the resolution of the device without changing the number of memory circuits utilized therein.

Another object of my invention is to provide a track and store device which permits lower cost components of a noncritical nature to be used therein and which eliminates the need for digital to analog converters, heretofore, necessary in certain types of synchronizers.

A further object of my invention is to provide a uniquely constructed track and store device which will tolerate variations in supply voltages, ground potential and current levels. It is an important feature of this object that production tolerances can be less tight and costs reduced since the extremely critical level for completely digital circuitry has been eliminated.

A further object of my invention is to provide a track and store device which, because of the unique combination of circuit components, permits the utilization of same which are capable of operating under greater temperature extremes and which are obtainable at a lower cost than comparable components necessary for completely digital-type devices. This feature allows a designer utilizing my device more freedom is placing same in various areas of the aircraft since temperature extremes are no longer of paramount consideration.

Another object of my invention is to provide a synchronizing device constructed on a combination of analog and digital components which has a tracking speed comparable with known digital synchronizers during either the track or synchronizing mode of operation.

Another object of my invention is to provide a uniquely constructed track and store device that utilizes a triangular clock waveform and very sensitive feedback over a small error voltage range as a result of the short time required for one portion of the triangular waveform to go from the negative maximum to the positive maximum. This feature permits the device output error to be maintained at a very small value.

A further object of my invention is to provide a uniquely constructed synchronizer which is impervious to noise voltage, the power supply or ground circuitry. It is a feature of this object that the basic storage device is a capacitor rather than one or more flip-flop memories which could be adversely affected by noise to change the output by a factor of 10 or even more.

Another object of my invention is to provide a uniquely constructed track and store device which utilizes an input analog integrator to hold and maintain an input voltage and to stabilize that voltage by means of digital circuitry.

A further object of my invention is to provide a uniquely constructed track and store device which includes a feedback circuit to correct drift in the output voltage by the sampling of a triangular clock wave.

Another object of my invention is to provide a uniquely constructed track and store device which utilizes a periodic sampling technique to prevent output drift. It is a feature of this object that a ramp generator output either climbs or descends to become equal to the output voltage and provides an input to the one-shot multivibrator to provide a feedback sample. This sampling technique is used continuously and is repeated every few milliseconds if required. In other words, each time the ramp generator equals the output voltage a new sampling sequence will begin. This is to be contrasted with a 0 type of sampling present in many conventional digital-type synchronizers wherein a voltage reference is established on the digital synchronizer and there is no sampling of the output from that time. As a result, once the flip-flops and the digital synchronizer have been set to the reference voltage, a component failure or noise input that inadvertently changes the state of one of the flip-flops would not cause an indication of an internal failure, however, such a condition does not affect my device.

Other and further objects of the invention, together with the features of novelty appurtenant thereto, will appear in the course of the following description.

DETAILED DESCRIPTION OF THE INVENTION

In the accompanying drawings, which form a part of the specification, and are to be read in conjunction therewith, and in which like reference numerals indicate like parts in the various views:

FIG. 3 is a block diagram of a track and store device embodying my invention;

FIG. 4 is a waveform diagram showing the various waveforms at the critical times in my track and store device;

FIG. 4a is an enlarged view of the feedback voltages; and

FIG. 5 is an enlarged view of the sample voltage from the clock output which is fed into the integrator to compensate for output error.

Figure 1:
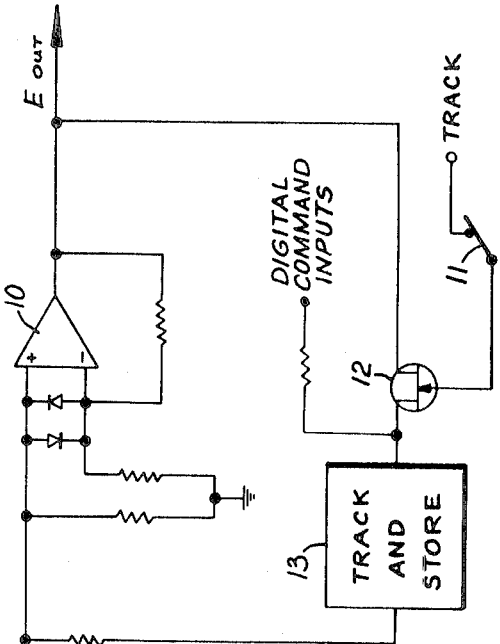
FIG. 1 is a block diagram showing typical synchronizer circuitry utilizing my track and store device.

Turning now more particularly to the drawings, the E in voltage shown in FIG. 1 may represent a given flight parameter such as indicated airspeed. If, for example, an aircraft had an indicated airspeed of 200 miles per hour which correspond to a positive 5 volts in the autopilot circuitry, then 5 volts would be passed through amplifier 10 thereby forming an output voltage represented by the symbol E out. When the synchronizer is in the track mode, (with switch 11 moved to the track terminal) the 5 volts of output would be passed through the synchronizing device 13, establishing a negative 5 volts and causing the net E out to equal 0 volts. To facilitate the output going to 0 volts, a switching device (including FET switch 12) on the flight controller panel must be switched to the sync (synchronize) mode. When in the sync mode, the output of the track and store circuit is summed together with the input voltage of the opposite polarity to cause the output to remain at 0 volts regardless of what value the input voltage (E in) has acquired. When switch 11 is switched to the terminal labeled store, the track and store circuit 13 will now maintain indefinitely the last voltage that was present in the circuit. Any further variations in the input voltage (E in) as same relates to the indicated airspeed of the aircraft will be represented at the output by a corresponding voltage. The output voltage, however, will vary (positively or negatively) from 0 volts since E out was at 0 at the time the track and store circuit was placed in the store mode. In this manner, the aircraft can be controlled by any given reference by a voltage which simply varies in either direction from 0.

The operation of the field effect transistor (FET) 12 mentioned above, hereinafter referred to as the FET switch, at the input to track and store circuit 13 is controlled by a particular switch button (not shown) on the flight control panel located in the cockpit. When the pilot operates the switch button to place the unit in the synchronizing or tracking mode, the FET switch is represented by a very low resistance allowing the output voltage or E out to be established on the synchronizing circuit so that the output voltage is always 0. At the time the pilot wishes to hold or maintain the given flight parameter, he depresses the appropriate button on the flight control panel representing the parameter he wishes to hold (such as indicated airspeed). FET switch 12 at the input of track and store device 13 will now revert to a very high resistance in the order of many megohms such that the output no longer can effect the voltage established on the track and hold circuit. Further variations in input voltage will be reflected at the output as an error voltage.

If the pilot wishes to change the reference parameter he has established on the track and hold circuit, he may do so by supplying digital pulses into the digital command input at the input of track and store device 13. These digital command inputs are supplied from the command wheel located on the flight control in the cockpit. Accordingly, if a pilot has established a reference of 200 miles per hour and wishes to fly at a speed of 220 miles per hour, he then rotates the pitch command wheel on the flight controller in the cockpit forward until the aircraft is flying at 220 miles per hour. When the pilot releases the pitch command wheel, the aircraft will maintain the selected 220 miles per hour indefinitely.

Amplifier 10 in FIG. 1 is a conventional operational amplifier which provides for an easy summing of the voltage levels such as the designated E in and the output of track and store device 13. The amplifier output has a very low impedance which provides for easy summing of inputs to amplifiers beyond and downstream of the amplifier E out. Likewise, if the input voltage (E in) is changing very rapidly as the result of the switching from one parameter to another, the step input at E in will be synchronized within approximately 10 milliseconds by the track and store circuit so that the output at E out will not represent any substantial input to the autopilot during this tracking mode operation. In other words, the track and hold circuit has the capability of changing the output in a very rapid or very slow manner.

Figure 2:
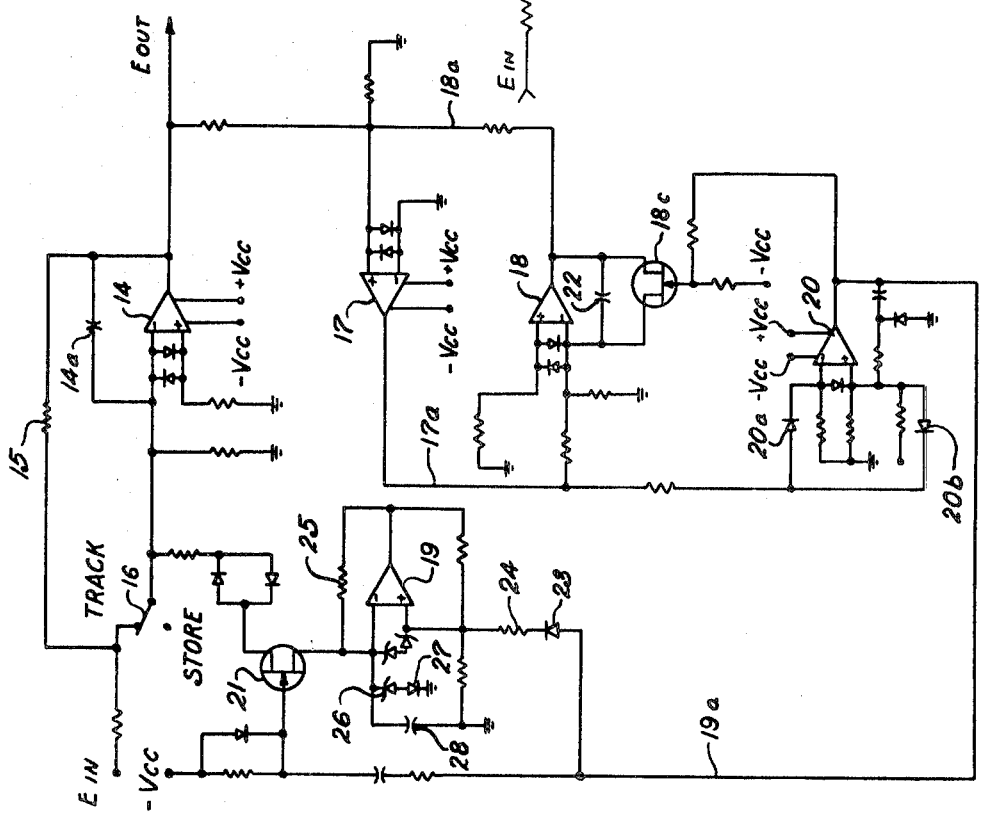
FIG. 2 is a circuit diagram of a track and store device embodying my invention.

Turning now more particularly to the circuit diagrams shown in FIGS. 2 and 3, the operation of the track and store device utilizes the principle that a voltage on a capacitor can be maintained and stabilized by a digital feedback circuit. The capacitor (14a) on which the reference voltage is originally established operates with the circuitry of the operational amplifier, generally indicated by the numeral 14 to form an integrating device. Capacitor 14a will tend to maintain a constant voltage or, stated another way, will maintain that voltage that existed on same at the time the input was removed. Accordingly, when input switch 16, shown at the upper left-hand portion of FIGS. 2 and 3 is in the track position, any input voltage will be reflected at the output (E out) since amplifier 14 acts as an amplifier as a result of the resistive feedback circuit with resistor 15 therein. With switch 16 in the above-mentioned track position, capacitor 14a will always charge to a voltage equal to the output (E out) potential. When switch 16 is moved to the store position, the capacitor (14a) will tend to maintain the original E out voltage that existed just prior to switching same to the store position.

Continuing on with the description of my track and store device, after the switch has been thrown to store, the output voltage now existing on capacitor 14a around amplifier 14 will be fed to the input of comparator 17. This voltage switches the comparator output level from a positive supply voltage to a negative supply voltage (or vice versa) depending upon the polarity of the E out voltage. It follows then, that the comparator amplifier 17 has only two steady state output conditions equaling either the positive supply voltage or the negative supply voltage and that the output conditions are determined by the summation of all of the input signals to the comparator.

It should be noted that a second input to the comparator is delivered from ramp generator 18 via line 18a. As will be discussed in more detail below, the ramp generator voltage, at the beginning of each testing cycle, will be at 0 volts so that the output of comparator 17 will be determined solely by the output of amplifier 14 (E out voltage). The output of comparator 17 is in turn fed to the input of ramp generator 18 via line 17a. If the output voltage (E out) is positive, the output of comparator 17 will be positive since E out is directed to the noninverting or positive side of comparator 17. This positive output is fed into the negative or inverting side of ramp generator 18, thus causing a negative going ramp out of the ramp generator 18. Since the output from the operational amplifier 14 mentioned above is positive and the ramp generator output is negative going, there will be a point where the ramp generator voltage is equal to but opposite in magnitude from the E out voltage. At this transition point, the total input to the comparator will go from a positive voltage through 0 to a negative voltage thereby resulting in the output of comparator 17 being switched from the level of the positive supply voltage to the negative supply voltage level. Of course, this comparator output could be selected to equal any desired value and is not limited to the above-mentioned level of the supply voltages.

When the original sequence began, e.g., when the ramp generator was at 0 and the output voltage was at some positive value, master clock oscillator 19 began to run. (The master clock may be a square wave generator operating at approximately 20,000 cycles per second or any other usable frequency including a nonperiodic function so long as the same train is reproduced for each sampling sequence). This clock is the basic timing circuit for the entire synchronizer or track and store device. By using a constant frequency master clock 19, a fixed number of cycles in the clock output will occur in the time that ramp generator 18 begins to climb or descend until the time that the output of ramp generator 18 is equal to the output of amplifier 14 (the E out voltage). For example, if the E out voltage is 5 volts and 100 cycles of the master clock output occur from the time the ramp generator starts from 0 to the time it reaches the value equal to but opposite from the output voltage then 100 cycles should occur for every sequence. While the clock is running, the ramp generator is increasing in a negative direction so that it will soon be equal to but opposite from the input integrator voltage (the E out voltage) and the number of cycles of the output of the clock will be approaching the 100 number. When the ramp generator output voltage finally is equal to but opposite from the input voltage, the comparator 17 then switches output levels from the positive value to the negative value, and a circuit discussed infra, will shutoff the clock at or near the 100 cycles number, depending upon the E out voltage.

As suggested above, when the comparator circuit switches from the positive value to the negative value, the operating sequence is two fold: (1) The ramp generator 18 is reset to 0 volts; and (2) A one-shot multivibrator circuit or pulse generating circuit generates a single pulse which is fed to the clock circuit to shutoff same. In this manner, the shutting off of the clock insures that it will always start at the same point, thus each sequence will end with the same number or close to the same number of cycles.

At the completion of the one-shot pulse which was produced by one-shot multivibrator 20, the entire sequence will begin again. The output voltage (E out) has not changed but the ramp output from ramp generator 18 has now been set back to 0 volts. The output voltage from comparator amplifier 17 has returned to the positive value. The clock now begins to run and the ramp generator starts to build in a negative direction caused by the output (the positive voltage output) of the comparator circuit. When the ramp generator again reaches the output voltage of amplifier 14, the comparator 17 output changes state from its positive voltage to its negative voltage, resets the ramp generator 18, initiates a one-shot pulse which triggers the master clock and provides a sample feedback to stabilize the output voltage E out.

As clearly seen in FIG. 4, the output of master clock generator 19 is in the form of a triangular wave. The triangular waveform is symmetrical about 0 volts (or ground reference) and passes through 0 volts two times each cycle. At the end of each sequence when the one-shot multivibrator 20 fires, master clock 19 is shutoff and a field effect transistor (FET) switch 21 located at the input to the integrator or operational amplifier 14 is turned on tor a short period of time to allow the feedback signal to be fed from the clock circuit to the input of the integrator circuit. The feedback potential fed from clock 19 to the integrator circuitry is taken from the clock triangular waveform with the polarity of the feedback signal being determined by the position of the triangular waveform with respect to 0 volts at the time the one-shot multivibrator 20 is triggered.

Returning to the example mentioned above wherein the period of time equal to 100 clock cycles represented the input voltage, the feedback signal will be obtained from the last or one hundredth cycle of the clock signal. If the one-shot multivibrator 20 fires as the last cycle of the pulse train passes through 0 or ground reference, there will be no effective feedback voltage fed to the integrator circuitry (14 and 14a) and therefore there will be no change in the E out voltage. If, however, a change in the E out voltage has occurred (as a result of leakage in the input capacitor 14a around operational amplifier 14 or the like) then the one-shot multivibrator 20 will be triggered before the triangular waveform has reached 0 volts. In this case, FET switch 21, which is located at the input to the input integrator, will pass the voltage represented by the triangular waveform at the point when the one-shot fired. This voltage may be positive or negative depending upon the direction in which the output had drifted. In other words, if the output voltage was originally at a positive 5 volts and had decreased a slight amount, the input from the feedback circuit will be a negative voltage. This negative voltage is fed through the inverting or negative side of the input integrator circuitry and therefore results in a positive going voltage at the output of the integrator. This positive going voltage increases the voltage on the input capacitor 14a and returns the output toward the original voltage value.

If the output drifts in a positive manner, the one-shot multivibrator will fire when the triangular waveform is positive. As the sample voltage is selected, the voltage as seen by the FET switch 21 will be positive. This positive voltage is fed through FET switch 21 into the input of the integrator circuitry. Since this positive voltage is going into the negative or inverting side of the input integrator, it will cause the output to go in a negative direction, therefore correcting the output error and reestablishing the original voltage reference.

Prior to the operation of multivibrator 20, the negative supply voltage (−Vcc) on the gate of FET 21 holds same in the open configuration. The FET (21) then acts as a very high resistance in the order of many megohms between the master clock and the input integrator circuitry. As a result, the input integrator circuitry is uneffected by the clock circuit during the period when the multivibrator 20 is not operating. When the multivibrator is triggered and delivers a pulse to the master clock 19, the master clock is shutoff and a positive going pulse is fed to the gate of FET switch 21 via line 19a. This causes the gate voltage to go to approximately 0 volts changing the very high FET impedance to a very low-impedance device and allows the output voltage from master clock 19 to be delivered to the input of the integrator circuitry in the form of a feedback signal.

The time increment in which the FET switch 21 is in the low-impedance configuration is extremely short so that the sampled voltage from the triangular waveform is a very small percentage of the total time (see FIG. 5).

Assuming the existence of an error or drift in the output voltage, such that a feedback voltage was necessary to correct same in a proper direction, the E out voltage then will require a slightly higher or lower ramp voltage to equal the E out and therefore will require either more or less time for the ramp voltage to equal the E out. It follows, therefore, that the feedback sample will occur at a different time on the last triangular waveform prior to clock stoppage. The eventual effect of the feedback voltage is that the triangular waveform will pass through 0 volts at a future sampling and therefore no additional feedback will occur.

As suggested above, the one-shot multivibrator 20 must be capable of utilizing either positive or negative input voltages and must be able to develop an output pulse as a result of a change in the comparator output voltage from positive to negative or from negative to positive. By locating two diodes 20a and 20b at the input side of the multivibrator 20 but reversing the polarity of same, a transition from a positive to a negative input voltage will go into the noninverting side of the amplifier and the negative to positive transition of the comparator output will be fed into the inverting side of multivibrator 20. Both of the inputs will result in a negative to positive to negative pulse at the output of multivibrator 20 (the one-shot monostable circuitry). The output pulse from multivibrator 20 is then fed to ramp generator 18 through a ramp reset circuit 18b (including FET 18c) in order to discharge an associated ramp capacitor 22 so that the output of the ramp generator will return to 0 volts at the end of each feedback sequence.

The use of the FET switch 18c located across ramp generator capacitor 22 controls the output of the ramp generator. For instance, during the period that the ramp generator output voltage is either increasing or decreasing, the FET switch 18c is being excited by the negative supply voltage (−Vcc) and therefore represents a very high impedance so that the capacitor (22) will not be discharged by same. When one-shot multivibrator 20 is triggered to deliver a positive pulse at the output thereof, the impedance of FET switch 18c across ramp generator capacitor 22 is reduced to approximately 100 ohms so that capacitor is permitted to discharge rapidly to 0 volts. The termination of the one-shot multivibrator output pulse returns FET switch 18c to the high-impedance state and allows the capacitor to charge in either a positive or negative direction.

When one-shot multivibrator 20 is triggered, the positive pulse appearing on the output thereof is also fed to the master clock circuitry through diode 23 and resistor 24 (see FIG. 2) via line 19a. This positive voltage interconnects with the positive or noninverting side of the master clock amplifier 19 and causes the output of amplifier 19 to go to the positive supply voltage (+Vcc). The positive supply voltage output is fed back to the input through resistor 25 to the inverting side of amplifier 19. Additionally, this positive voltage is impressed upon a Zener diode 26 and a forward diode 27 which are connected across timing capacitor 28 of the master clock circuitry. In order for the master clock to run as a free running oscillator, the voltage on timing capacitor 28 must become more positive than the voltage on the positive or noninverting side of amplifier 19. With the voltage on capacitor 28 exceeding the voltage on the positive (noninverting) side of amplifier 18, the amplifier will immediately switch from a positive voltage output to a negative voltage output. As a result of the output pulse from multivibrator 20 in combination with diodes 26 and 27, the capacitor voltage is not allowed to increase above a preselected value (arbitrarily selected as 3.3 volts) and therefore will never exceed the positive voltage on the noninverting portion of amplifier 19 and will not sustain oscillations. As soon as the output pulse from multivibrator 20 terminates, the voltage of the noninverting positive side of amplifier 19 will return to the normal value. At this time, the voltage (the 3.3 volts on the timing capacitor) will exceed the voltage on the noninverting side and the amplifier will immediately switch to the negative supply voltage and continue to oscillate at the desired frequency.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An electronic track and store device comprising
an analog integrator having an input and an output voltage,
a feedback circuit interconnected between said input and said output, said feedback circuit including an oscillator means for producing a signal output which is correlated in time to the output voltage of said integrator,
means for monitoring the level of said integrator output voltage to produce a sampling signal indicative of a difference in preselected value between said input and said output, and
means for producing a proportional error signal from said oscillator signal by sampling said oscillator signal with said sampling signal, said error signal being fed back to said integrator input via said feedback circuit to maintain said integrator output voltage at a constant preselected value.

2. The invention as in claim 1 wherein said monitoring means includes
means for generating a ramp signal each time said integrator output is monitored, said ramp signal going from a reference value to a value proportional in magnitude to said integrator output in a time period, and
means for determining if said time period is the same for each operation of said monitoring means, said error signal producing means operable to produce said error signal when said time period varies.

3. The invention as in claim 2 wherein said determining means includes a means for sampling said oscillator signal at the end of said time period, said sampled signal being fed back via said feedback circuit to maintain said integrator output voltage at said constant value.

4. The invention as in claim 3 wherein said sampling means includes
a monostable circuit means for producing an output pulse having a quasi-stable state,
a means for triggering said monostable means at the end of said time period, and
switch means for interconnecting said oscillator signal voltage level with said integrator input when said monostable produces said quasi-stable output pulse, said signal voltage level at the end of said time period being operable to maintain said integrator output voltage at a constant value.

5. The invention as in claim 2 wherein said device includes a comparator circuit, said comparator circuit having its input connected to the output of both the integrator and the ramp generator means, said comparator operable to reverse the polarity of its output when said ramp voltage is at a preselected value proportional in magnitude to said integrator output, and means for sampling said oscillator signal upon the reversal of said comparator output voltage, said sampled signal operable to maintain said integrator output voltage via said feedback circuit.

6. The invention as in claim 5 wherein said sampling means includes
a monostable circuit means for producing an output pulse having a quasi-stable state,
a means for triggering said monostable means at the end of said time period, and
switch means for interconnecting said oscillator signal voltage level with said integrator input when said monostable produces said quasi-stable output pulse, said signal voltage level at the end of said time period being operable to maintain said integrator output voltage at a constant value.

7. The invention as in claim 2 wherein said feedback circuit includes
a comparator circuit, said comparator circuit having an input from the output of said integrator and said ramp generator, said comparator circuit operable to reverse the polarity of its own output when said ramp generator output voltage reaches a preselected level proportional to the magnitude of said integrator output voltage,
a monostable circuit means operable to be triggered upon the reversal of polarity of said comparator circuit output, said triggered output of said monostable circuit means operable to sample the voltage level of said oscillator signal at the time said comparator output reverses, said oscillator signal voltage level being fed back to said integrator to maintain said integrator output voltage at a constant value.

8. the invention as in claim 7 wherein said monostable circuit means has a quasi-stable output pulse, and
switch means interconnected between said monostable circuit and said integrator input for interconnecting said oscillator signal voltage level with said integrator input when said monostable circuit produces said output pulse.

9. The invention as in claim 1 wherein said monitoring means includes,
means for generating a ramp signal each time said integrator output is monitored, said ramp signal going from a reference value to a value proportional in magnitude to said integrator output in a time period,
a comparator circuit, said comparator circuit having its input connected to the outputs of both the integrator and the ramp generator means, said comparator circuit operable to reverse the polarity of its output when said ramp signal output voltage reaches a preselected value proportional in magnitude to the integrator output,
a monostable circuit means for producing an output pulse having a quasi-stable state,
a means for triggering said monostable means after means for triggering said monostable means upon the reversal of said comparator output signal voltage, and
switch means for interconnecting said oscillator signal voltage level with said integrator input when said monostable produces said quasi-stable output pulse, said signal voltage level at the end of said time period being operable to maintain said integrator output voltage at a constant value.

10. The invention as in claim 9 wherein said device includes a means for shutting off said oscillator means after said comparator output reversal and means for resetting said ramp generator after said comparator output reversal to a reference value.

* * * * *